US011731697B2

(12) United States Patent
Howe et al.

(10) Patent No.: US 11,731,697 B2
(45) Date of Patent: Aug. 22, 2023

(54) VECTOR STEERING FOR TRACKED VEHICLE

(71) Applicant: Howe & Howe Inc., Waterboro, ME (US)

(72) Inventors: Michael Howe, Biddeford, ME (US); Geoffrey Howe, North Berwick, ME (US)

(73) Assignee: Howe & Howe Inc., Waterboro, ME (US)

( * ) Notice: Subject to any disclaimer, the term of this patent is extended or adjusted under 35 U.S.C. 154(b) by 225 days.

(21) Appl. No.: 17/190,598

(22) Filed: Mar. 3, 2021

(65) Prior Publication Data

US 2021/0276618 A1 Sep. 9, 2021

Related U.S. Application Data

(60) Provisional application No. 62/985,424, filed on Mar. 5, 2020.

(51) Int. Cl.
*B62D 11/22* (2006.01)
(52) U.S. Cl.
CPC .................. *B62D 11/22* (2013.01)
(58) Field of Classification Search
CPC ....................................................... B62D 11/22
USPC ........................................................ 180/9.44
See application file for complete search history.

(56) References Cited

U.S. PATENT DOCUMENTS

| 1,286,836 | A | * | 12/1918 | Tesluk | B62D 55/205 |
| | | | | | 305/44 |
| 1,756,770 | A | * | 4/1930 | Buck | B62D 11/22 |
| | | | | | 305/141 |
| 2,151,287 | A | * | 3/1939 | Von Bleichert | B62D 11/22 |
| | | | | | 180/9.44 |
| 2,352,086 | A | | 6/1944 | Eberhard | |
| 3,017,942 | A | * | 1/1962 | Gamaunt | B62D 55/0963 |
| | | | | | 180/9.1 |
| 5,101,919 | A | | 4/1992 | Ossi | |
| 6,039,132 | A | | 3/2000 | Easton | |
| 8,474,554 | B2 | | 7/2013 | Howe et al. | |
| 9,873,468 | B2 | | 1/2018 | Howe et al. | |
| 10,745,065 | B2 | | 8/2020 | Howe et al. | |
| 2010/0236844 | A1 | | 9/2010 | Howe et al. | |
| 2016/0096563 | A1 | | 4/2016 | Tigue et al. | |
| 2020/0377162 | A1 | | 12/2020 | Howe et al. | |

FOREIGN PATENT DOCUMENTS

| DE | 866319 | 7/1949 |
| DE | 102015000412 | 7/2016 |
| EP | 0947414 | 8/2000 |
| EP | 1564518 | 8/2005 |
| WO | 9832622 | 7/1998 |
| WO | 2013010110 | 1/2013 |

\* cited by examiner

*Primary Examiner* — Kevin Hurley
*Assistant Examiner* — Felicia L. Brittman
(74) *Attorney, Agent, or Firm* — BainwoodHuang (57) ABSTRACT

A technique for steering a tracked vehicle includes controllably deforming at least a portion of a vehicle's track into a curved shape, causing the vehicle to follow a curve-shaped path as it drives. As the vehicle naturally tends to follow a curved path defined by the track's curvature, steering is accomplished with greatly reduced skidding against the ground.

20 Claims, 6 Drawing Sheets

VECTOR STEERING FOR TRACKED VEHICLE

FIELD

This invention relates generally to ground mobility, and more particularly to tracked vehicles.

BACKGROUND

Tracked vehicles since inception have accomplished vehicle steering by varying the speed of one track relative to another. For example, a tracked vehicle, such as a tank, loader, farm vehicle, recreational vehicle, or the like, includes left and right tracks that are capable of driving independently at different speeds. To turn to the right, the vehicle drives the right track more slowly than the left track. To turn to the left, the vehicle drives the left track more slowly than the right track. This so-called "skid-steering" technique is both simple and versatile.

SUMMARY

Unfortunately, skid steering involves certain deficiencies. For example, the skid-steering approach relies upon pivoting tracks against the ground and can thus result in rough rides that can be difficult for drivers to control. In addition, skid steering causes abrasion between tracks and the ground, potentially damaging roads, other surfaces, and the tracks themselves. Skid steering can also cause wear and damage to drive wheels and suspensions. Further, damage to roads and other surfaces can make the vehicles easy to detect and follow, impairing the ability of persons to use the vehicles without being detected.

In contrast with tracked vehicles that are limited to skid steering, an improved technique for steering a tracked vehicle includes controllably deforming at least a portion of a vehicle's track into a curved shape, causing the vehicle to follow a curve-shaped path as it drives. As the vehicle naturally tends to follow a curved path defined by the track's curvature, steering is accomplished with greatly reduced skidding against the ground. Drivers thus have greater control over steering and enjoy smoother rides, while ground surfaces and vehicle components are spared much of the damage that normally results from skid steering. Detection is easier to avoid, as well, as the improved technique causes less detectable disturbance to ground surfaces.

According to some examples, the improved technique, which we refer to herein as "vector steering," may be used as a sole method of accomplishing steering. According to other examples, vector steering is combined with skid steering to provide multi-mode steering.

In some examples, multi-mode steering is manually controlled, e.g., by providing one set of driver controls for vector steering and another set of driver controls for skid steering. This approach may rely upon the driver to combine the two modes in any desired manner.

In other examples, multi-mode steering is controlled automatically, e.g., by providing a single steering control, such as a steering wheel or joy stick, and automatically switching between and/or blending vector steering with skid steering based on driving circumstances. For example, an electronic controller and/or mechanical coupling may sense a driver-applied turning angle and select a steering mode accordingly. Low-angle steering may be handled solely by vector steering, whereas high-angle steering may be handled solely by skid steering. Angles between specified low and high thresholds may be handled by a combination of both vector steering and skid steering. In some examples, the combination may be weighted so as to gradually transition between pure vector steering and pure skid steering based on applied turning angle relative to the thresholds.

In some examples, vector steering involves driving an outer track of the vehicle at a higher speed than an inner track, to account for the outer track having to cover a greater distance than the inner track for accomplishing any desired turn. According to some variants, the mechanical coupling and/or electronic controller adjusts inner and/or outer track speeds in response to driver input, e.g., to provide speed differences that vary based on turning angle.

In a particular example, a vehicle employs a drive-by-wire arrangement in which a transducer measures applied steering input from the driver and processes the steering input to produce different speeds and/or turning angles of the left and right tracks. The transducer may include, for example, an optical encoder, a voltage-sensing device, a current-sensing device, or any other type of device capable of translating applied steering input to digital signals.

In some examples, the vehicle includes a wheel that engages the track. For example, the track may partially wrap around the wheel. The wheel may be a front sprocket, a rear sprocket, or some other wheel positioned at a front or rear of the track. The wheel may be a drive wheel for propelling the track or it may be a free spinning wheel, such as a road wheel or an idler wheel. The wheel is configured to turn in response to driver input, and turning the wheel has the effect of deforming the track and causing it to turn in the same direction as the wheel. A wheel of this sort may be provided on each side, i.e., one wheel on each track. In some examples, two wheels may be provided for each track (or for one track), one at the front and another at the back, with the two wheels on each side configured to turn in opposite directions in response to driver input.

In some examples, a mechanism is provided to move one or more wheels laterally relative to the vehicle in response to driver input to turn the vehicle. For example, when the driver provides steering input to turn the vehicle to the right, a wheel positioned at the front-right of the vehicle is caused to extend outwardly from the vehicle, thereby allowing the right track to form an arc whose center falls to the right of the vehicle. Likewise, a front-left wheel may extend inwardly, toward the vehicle, to allow the left track to similarly form an arc whose center falls to the right of the vehicle. According to some variants, centrally-located wheels along the track are configured to move laterally in and out in response to steering input, again to enable the associated tracks to form arcs. Such movement of centrally-located wheels may be in addition to or as an alternative to laterally-moveable front and/or rear wheels.

As yet another alternative, tracks may be placed on wheels in a manner that allows a degree of lateral movement of tracks relative to wheels, such that providing for lateral movement of wheels is not required. As the driver provides steering input, the track deforms and laterally translates relative to the wheels as needed to form arcs. The provisions for lateral movement, or play, may be limited in some examples to centrally located wheels. Thus, front and rear wheels may provide less play than central wheels, such that most of the lateral movement of the track is in the middle rather than at the ends.

In some examples, the track itself is made of a flexible material that is capable of deforming in response to driver input. For example, the track may include multiple track segments oriented transversely relative to a direction of the track and linked together in a manner that allows each track segment to articulate relative to its immediate neighbors. In an example, each track segment has a rigid body and the bodies of different segments are joined together by flexible linkages. The linkages may be made of rubber or some other compliant material. Such material may be integral with that of the main body, or it may be separate. In another example, track segments are manufactured separately and arranged end-to-end, from a first track segment to a last track segment, with the last track segment connecting back to the first track segment to form a loop. Each track segment (or some subset thereof) forms an articulating joint with an immediately previous track segment and is capable of turning slightly right and left relative to the previous track segment. The articulating joints between the adjacent track segments allow the track to deform without requiring excessive turning force.

Certain embodiments are directed to a tracked vehicle that provides vector steering, or that provides both vector steering and skid steering. Other embodiments are directed to a steering system for use in a tracked vehicle. Further embodiments are directed to a method of steering a tracked vehicle. Still further embodiments are directed to a control system for combining vector steering with skid steering. Additional embodiments are directed to a computer program product. The computer program product stores instructions which, when executed by control circuitry, cause the control circuitry to perform a method of steering a tracked vehicle.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique for steering a tracked vehicle includes controllably deforming at least a portion of a vehicle's track into a curved shape, causing the vehicle to follow a curve-shaped path as it drives. As the vehicle naturally tends to follow a curved path defined by the track's curvature, steering is accomplished with greatly reduced skidding against the ground, promoting a smoother ride, avoiding damage to the ground and to vehicle components, and enabling stealthier operation.

Figure 1:
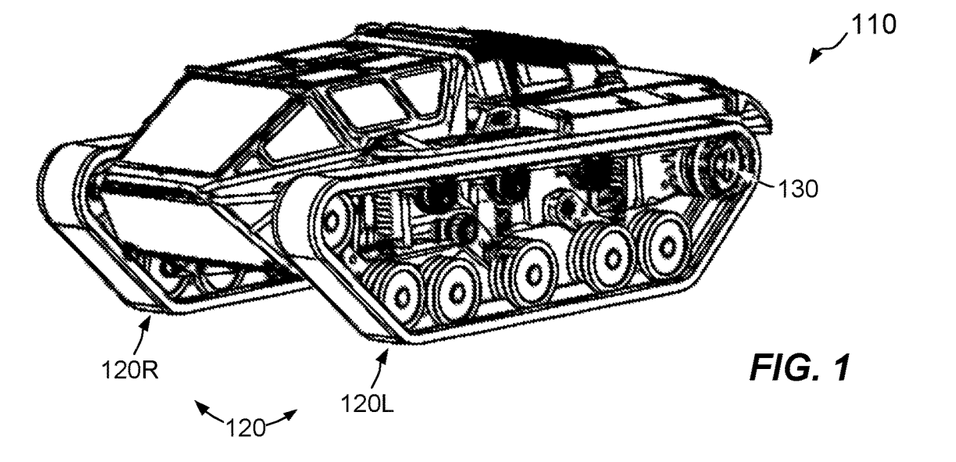
FIG. 1 is a front perspective view of an example tracked vehicle.

FIG. 1 shows an example tracked vehicle 110 having left and right tracks 120L and 120R, respectively. The tracked vehicle 110 is configured to drive on the tracks 120, e.g., in response to a motor or engine (not shown) applying rotation to wheels 130. The vehicle 110 may be configured for vector steering, or for both vector steering and skid steering.

Figure 2:
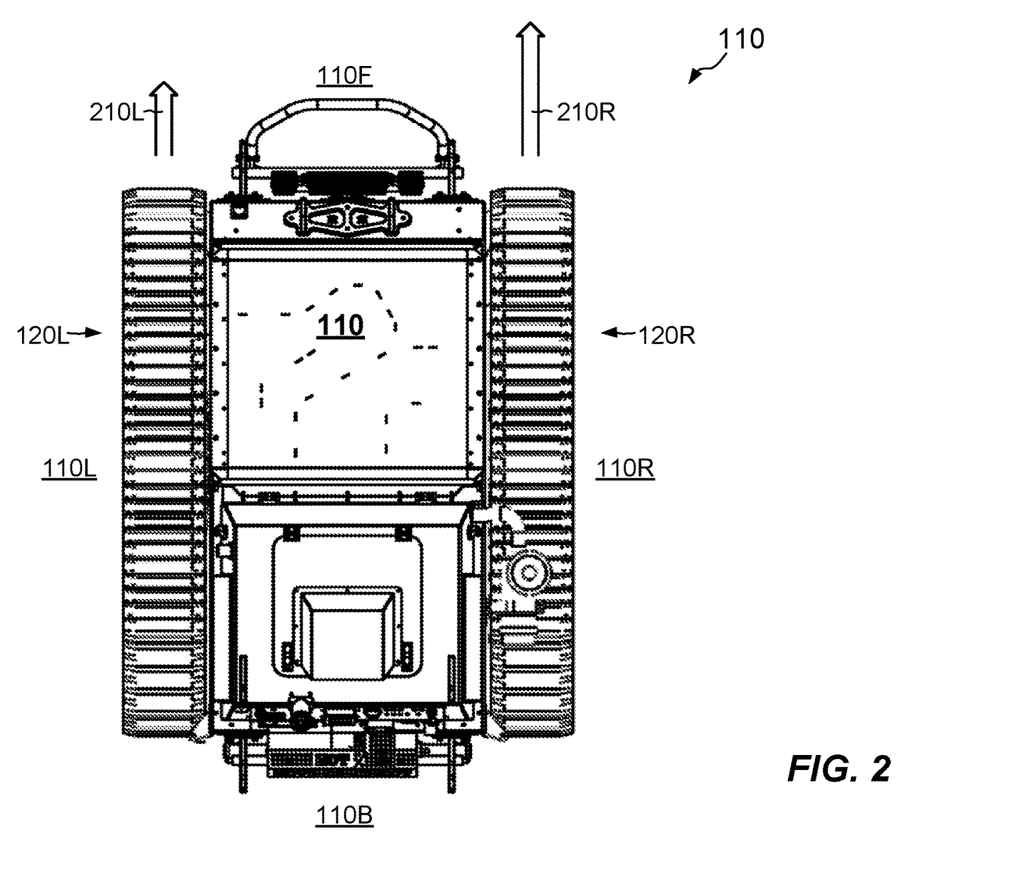
FIG. 2 is a top plan view of an example tracked vehicle performing skid steering.

FIG. 2 is a top view of the vehicle 110 of FIG. 1 (or a similar vehicle). As shown, the vehicle 110 has left and right sides 110L and 110R, respectively, as well as a front 110F and a back 110B. The vehicle 110 may accomplish skid steering by propelling the two tracks 120 at different speeds 210L and 210R. For example, the vehicle 110 may turn to the left by driving the right track 120R at a higher speed than the left track 120L. It may likewise turn to the right by driving the left track 120L at a higher speed than the right track 120R. It may drive straight ahead by driving both tracks 120 at the same speed. To turn on the spot, the vehicle 110 may drive one track forward and the other track backward. Skid steering of this kind can be highly effective for tight turns, but it also tends to cause wear to the tracks 120 and other components and may cause damage to any surface on which the vehicle 110 is driving.

Figure 3:
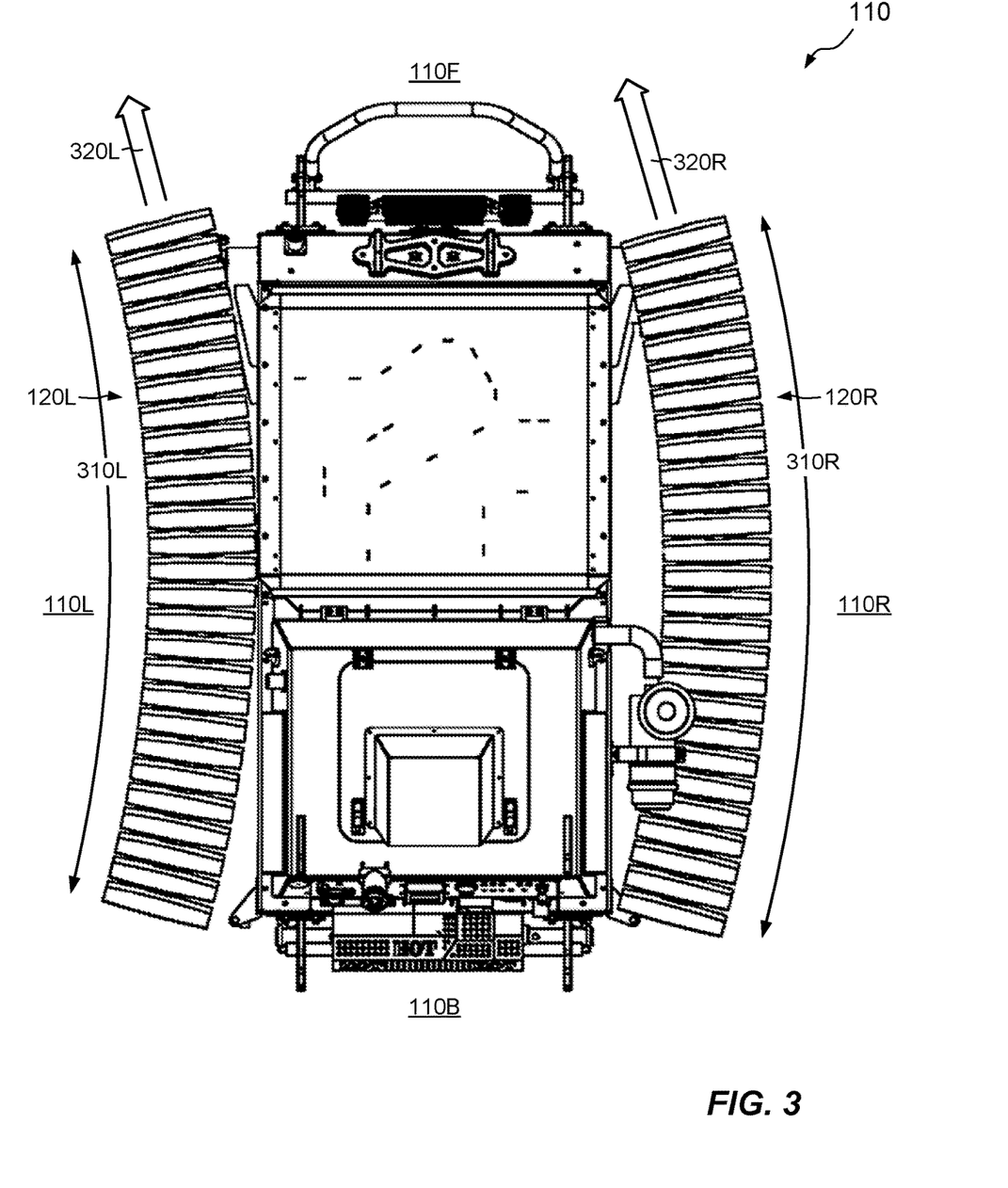
FIG. 3 is a top plan view of an example tracked vehicle performing vector steering.

FIG. 3 shows the vehicle 110 adapted for vector steering in accordance with improvements hereof. Here, tracks 120L and 120R have been deformed such that they respectively assume curved shapes 310L and 310R. The curved shapes 310L and 310R enable the vehicle to turn with much less skidding that typically accompanies skid steering (FIG. 2), as the vehicle 110 can merely follow the curved paths established by the tracks 120. The left and right curvatures 310L and 310R may differ slightly from each other to account for differences in the respective turning radii. Likewise, the left and right tracks 120L and 120R preferably run at slightly different speeds 320L and 320R, given that the outer track must cover more ground than the inner track to complete any given turn in the same amount of time.

Figure 4:
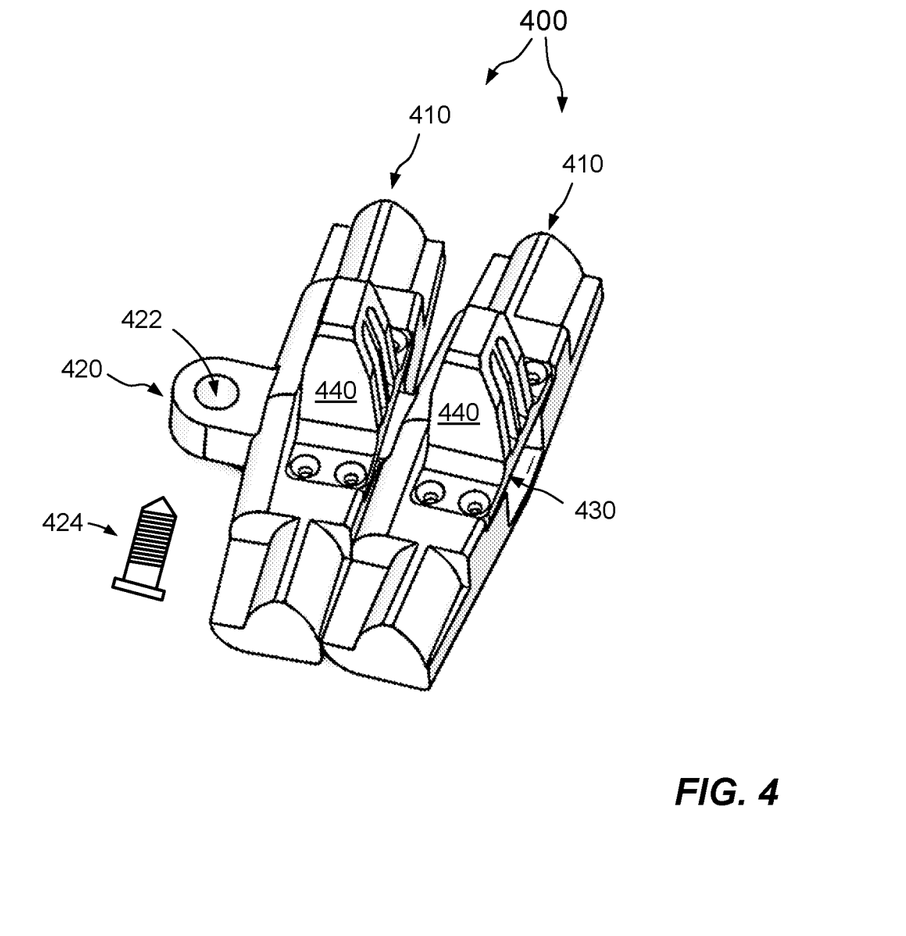
FIG. 4 is a perspective view of example articulating track segments that support vector steering in the tracked vehicle of FIG. 3.

FIG. 4 shows an example pair of links 400 from which tracks 120 may be assembled. For example, each track 120 may include a series of links 400 (e.g., 50 links, 100 links, etc.) strung together to form a respective loop. Each link 400 includes a body 410 made of rubber or some other rigid or semi-rigid material. A tab 420 extends from the body 410 of each link 400. The tab 420 is adapted to insert into a channel 430 formed within the body 410 of an immediately adjacent link 400. The channel 430 may have an open bottom or may have a hole (not shown) in the bottom. The tab 420 has a through-hole 422. To join each link 400 to its neighbor, the tab 420 of a current link is inserted into the channel 430 of its neighbor. A screw or other fastener 424 may then be inserted upwardly through the hole in the bottom of the channel 430 and through the hole 422 in the tab 420 of the current link. Each link 400 may include an upward projection 440, also referred to herein as a "shark fin," which receives the screw or other fastener 424 and retains it in place. With the depicted arrangement, each link 400 may rotate slightly left and right about the fastener 424. When links 440 are assembled together into a track 120, the resulting track 120 is capable of being deformed so as to establish curvatures necessary for vector steering.

One should appreciate that the depicted links 400 are merely one example of ways in which tracks 120 can be made to deform. For example, a continuous track 120 may be created from a composite material or from a single material having varying geometry in respective regions, which provides flexibility in the direction of lateral thrust.

Figure 5A:
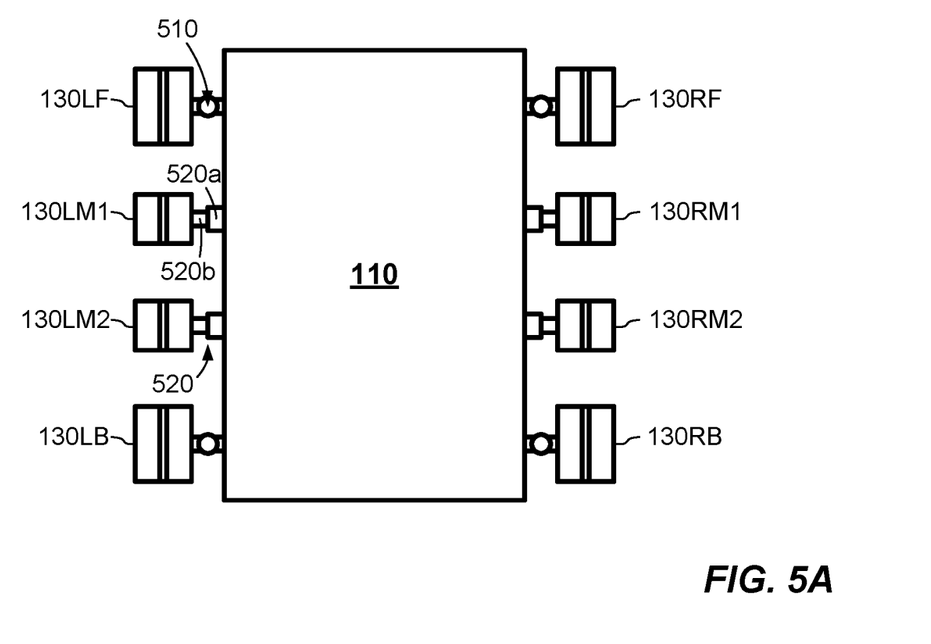
FIGS. 5A and 5B are top views of an example tracked-vehicle wheel arrangement for supporting vector steering, or both vector steering and skid steering, showing both a straight-ahead steering arrangement (FIG. 5A) and a turned steering arrangement (FIG. 5B).
Figure 5B:
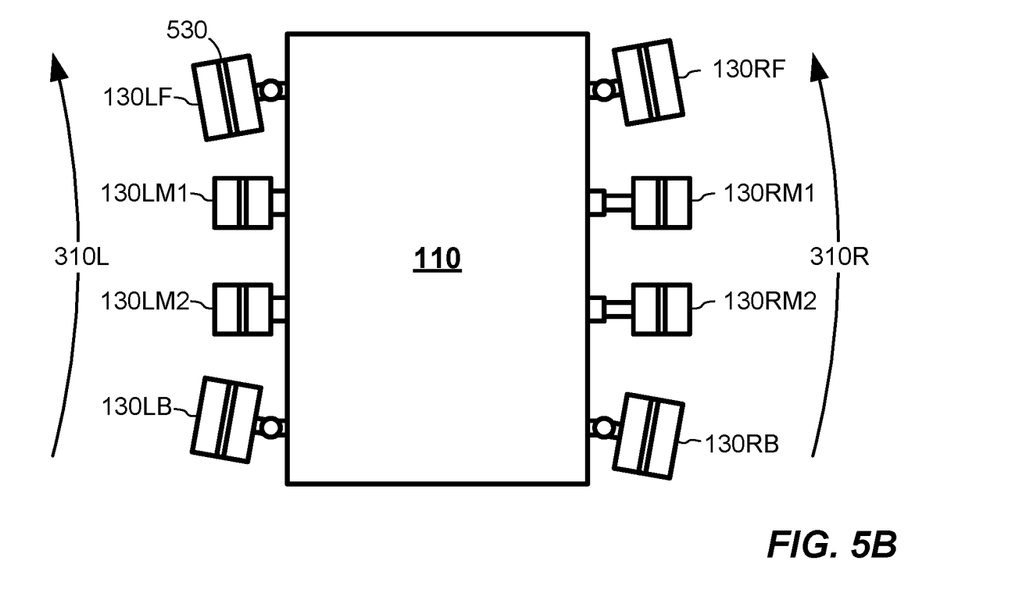

FIGS. 5A and 5B show an example wheel arrangement suitable for accomplishing vector steering, or both vector steering and skid steering. Four wheels 130 are shown on each side of the vehicle 110, but this is merely an example for illustration, as different numbers of wheels may be provided. The wheels 130 may be moveable in ways that are not common for tracked vehicles. For example, some or all of the wheels 130 may be left-right turnable. Also, some or all of the wheels 130 may be laterally moveable, i.e., toward or away from a main body of the vehicle 110.

As shown in FIG. 5A, front and back wheels 130LF, 130LB, 130RF, and 130RB are left-right turnable, e.g., by operation of respective joints 510, such as CV (constant velocity) joints or universal joints. Middle wheels 130LM1, 130LM2, 130RM1, and 130RM2 do not require joints 510, but such joints 510 may be provided if desired. In some examples, only front wheels 130LF and 130RF are left-right turnable, or only back wheels 130LB and 130RB are left-right turnable. Various mechanisms for achieving left-right turning of vehicle wheels are known in the art and are not covered here.

Middle wheels 130LM1, 130LM2, 130RM1, and 130RM2 may include thrust actuators 520, which are configured to move respective wheels laterally. The thrust actuators 520 may include telescoping members 520a and 520b, as shown, but they may alternatively use screws or the like. In some examples, all of the wheels 130 include thrust actuators 520, or a different number of them may. In some examples, the middle wheels 130LM1, 130LM2, 130RM1, and 130RM2 are laterally fixed, and only the outer wheels 130LF, 130LB, 130RF, and 130RB are laterally moveable. Many arrangements are possible.

FIG. 5B shows the same arrangement as in FIG. 5A, but here the wheels 130 are shown during execution of a left turn. Front wheels 130LF and 130RF each turn to the left on respective joints 510, and back wheels 130LB and 130RB each turn to the right. Left-middle wheels 130LM1 and 130LM2 retract, via respective thrust actuators 520, toward the body of the vehicle 110, while right-middle wheels 130RM1 and 130RM2 extend outwardly. The illustrated arrangement allows left and right tracks 120L and 120R to assume curved shapes 310L and 310R.

As shown, each of the depicted wheels 130 has a respective channel 530 adapted to receive shark fins 440 of links 400 and thus to assist in keeping the tracks 120 on the wheels 130. In some examples, some or all of the channels 530 may be oversized in width to allow a degree of play in the lateral position of the tracks 120 relative to the wheels 130. For example, the channels 530 of the middle wheels 130LM1, 130LM2, 130RM1, and 130RM2 may be oversized, whereas the channels 520 of the outer wheels 130LF, 130LB, 130RF, and 130RB may not be oversized.

Figure 6:
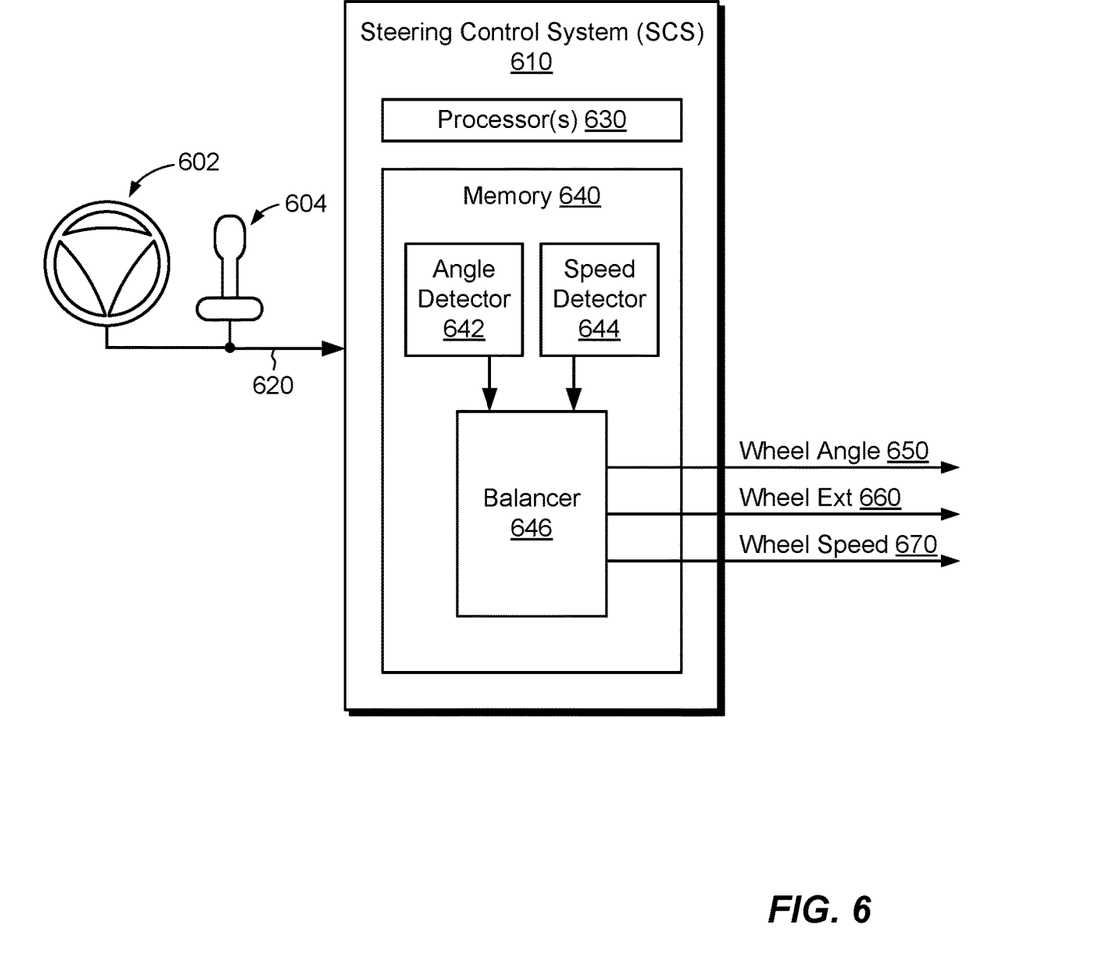
FIG. 6 is a block diagram showing an example control system for controlling vector steering, or for controlling both vector steering and skid steering.

FIG. 6 shows an example steering control system SCS 610 that may be used in connection with the vehicle 110. Here, the SCS 610 is configured to respond to steering input 620 from a steering wheel 602, joystick 604, or the like, which may be controlled by a human driver. The SCS 610 is seen to include a set of processors 630, such as one or more microprocessors or other control hardware, and memory 640. The memory 640 includes both volatile memory, e.g., RAM (Random Access Memory), and non-volatile memory, such as one or more ROMs (Read-Only Memories), disk drives, solid state drives, and the like. The set of processors 630 and the memory 640 together form control circuitry, which is constructed and arranged to carry out various methods and functions as described herein. Also, the memory 640 includes a variety of software constructs realized in the form of executable instructions. When the executable instructions are run by the set of processors 630, the set of processors 630 carry out the operations of the software constructs. Although certain software constructs are specifically shown and described, it is understood that the memory 640 typically includes many other software components, which are not shown, such as an operating system, various applications, processes, and daemons.

As further shown in FIG. 6, the memory 640 "includes," i.e., realizes by execution of software instructions, an angle detector 642, a speed detector 644, and a balancer 646. The angle detector 642 is configured to convert electronic input from the steering wheel 602 or joystick 604 into a corresponding representation of desired turning angle. The speed detector 644 is configured to provide a representation of vehicle speed. Balancer 646 is configured to receive input from the angle detector 642 and speed detector 644 and to generate, based on those inputs, wheel angle 650, wheel extension 660, and wheel speed 670. The wheel angle 650 provides left-right angles of each of the wheels 130 whose left-right angles can be controlled, e.g., each of the wheels 130 equipped with joints 510. The wheel extension 660 provides lateral extension for each of the wheels 130 whose lateral extension can be controlled, e.g., each of the wheels 130 equipped with thrust actuators 520. The wheel speed 670 provides a desired speed for each wheel 130 whose speed is controllable. For example, each track 120 has a single drive wheel for propelling the respective track 120 and wheel speed 670 provides a respective speed for each of them.

In example operation, a human driver operates the steering wheel 602 or joystick 604, as well as a throttle and brake (not shown). As applied steering or vehicle speed changes, the SCS 610 computes and outputs new values of wheel angle 650, wheel extension 660, and wheel speed 670. The vehicle 110 responds to the new values by establishing left-right turning angles and lateral thrust of affected wheels 130, and by setting wheel speed of drive wheels appropriately. Such operation may proceed continuously, as long as the vehicle is being driven.

In various examples, the functions of the SCS 610 are performed in whole or in part by mechanical components. For example, wheel angle 650 may be established by a mechanical steering system, such as Ackerman steering, short rack-and-pinion steering, or the like. Such systems may account for differences in steering angle between left and right wheels. Wheel extension 660 may be established passively, e.g., by allowing certain wheels 130 to move laterally in compliance with applied forces, such as forces applied by the tracks 120 against the wheels 130. Differences in wheel speed 670 may be supported using a differential gear system rather than by providing separate drive power to the drive wheel on each track. Thus, the particular use of an SCS 610 as described above should be regarded merely as one of many possible examples.

Figure 7:
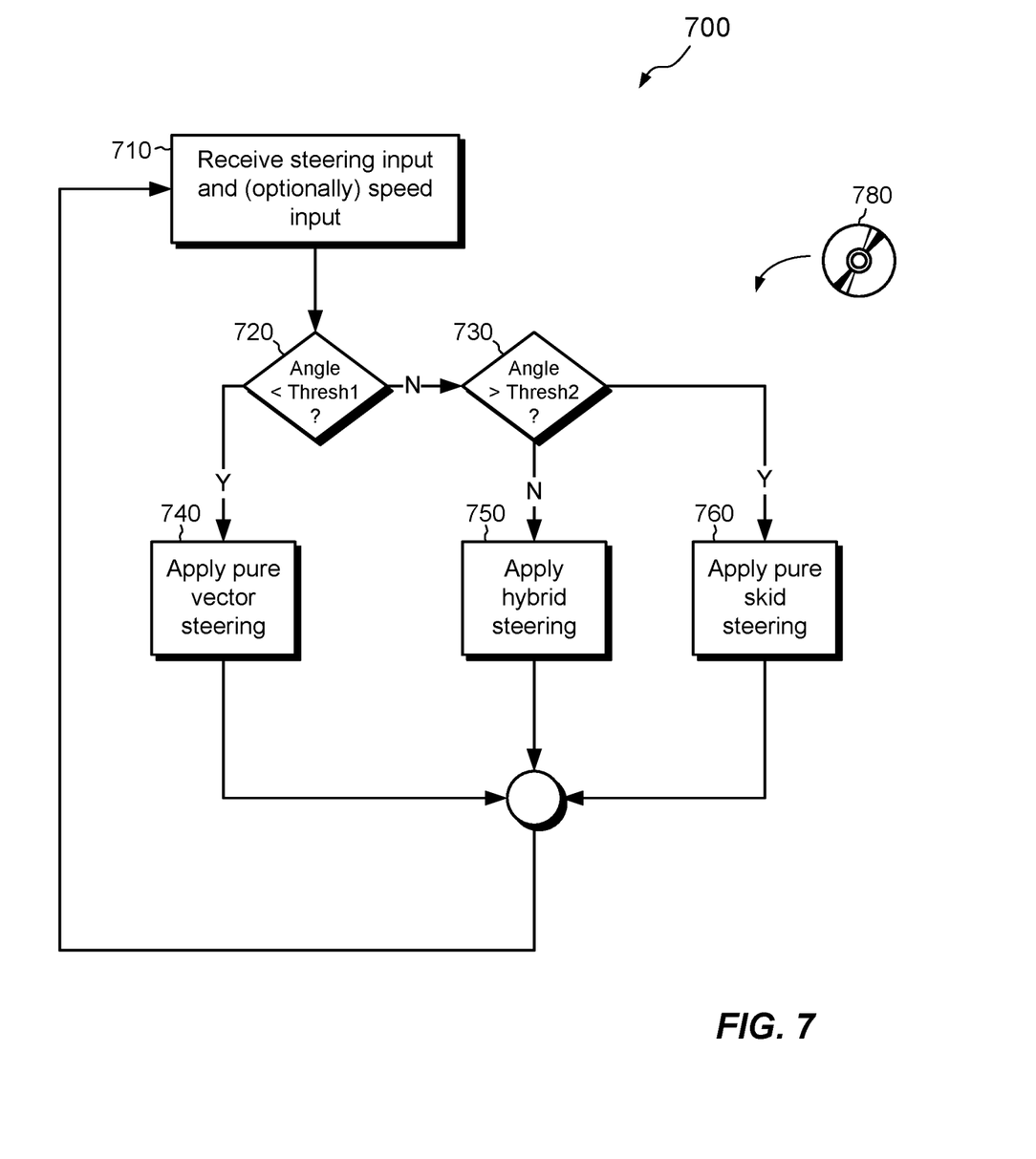
FIG. 7 is a flowchart showing an example method for controlling steering in a tracked vehicle.

FIG. 7 shows an example method 700 that may be carried out in connection with the vehicle 110. The method 700 is typically performed, for example, by the software constructs described in connection with FIG. 6, which reside in the memory 640 of the SCS 610 and are run by the set of processors 630. The various acts of method 700 may be ordered in any suitable way. Accordingly, embodiments may be constructed in which acts are performed in orders different from that illustrated, which may include performing some acts simultaneously. Although the illustrated example shows the SCS 610 as performing the described acts, one should appreciate that similar acts may be performed in whole or in part by mechanical systems.

At 710, the SCS 610 receives steering input 620 from the steering wheel 602 or joystick 604 in response to driver input. The SCS may convert the steering input 620 to a steering angle. The SCS may also receive speed control, e.g., from a throttle. It may further receive vehicle speed, e.g., from a speedometer.

At 720, the SCS 610 compares the steering angle with a first threshold. If the steering angle is less than the first threshold, operation proceeds to 740, whereupon the SCS 610 applies pure vector steering, i.e., by deforming the tracks 120 into curved shapes, such as shapes 310L and 310R. The SCS 610 may compute wheel angle 650, wheel extension 660, and wheel speed 670 as described above to so as to accomplish vector steering with minimal skidding.

Returning to 720, if the steering angle is greater than the first threshold, then at 730 the SCS 610 determines whether the steering angle exceeds a second threshold, which is greater than the first threshold. If so, operation proceeds to 760, whereupon the SCS 610 applies pure skid steering, i.e., effecting steering of the vehicle 110 by driving the two tracks 120L and 120R at different speeds but without deforming the tracks 120 into curved shapes.

If at 730 the steering angle is greater than the first threshold but less than the second threshold, operation proceeds to 750, whereupon the SCS 610 applies a hybrid steering mode, which blends vector steering with skid steering. For example, as the steering angle varies between the first threshold and the second threshold, the SCS 610 changes the balance of vector steering and skid steering to use more vector steering for angles close to the first threshold and to use more skid steering for angles close to the second threshold. In some examples, the proportion of vector steering to skid steering is varied linearly between the two thresholds.

Regardless of which steering mode is selected, the SCS 610 drives the associated actuators (e.g., steering, thrust, and power) in accordance with the selected mode. Operation then returns to act 710, whereupon steering input 620 is again received and the process repeats. Operation may proceed in this fashion indefinitely.

An improved technique has been described for steering a tracked vehicle 110. The technique includes controllably deforming at least a portion of a vehicle's track 120 into a curved shape, causing the vehicle 110 to follow a curve-shaped path as it drives. As the vehicle 110 naturally tends to follow a curved path defined by the track's curvature, steering is accomplished with greatly reduced skidding against the ground. Drivers thus have greater control over steering and enjoy smoother rides, while ground surfaces and vehicle components are spared much of the damage that normally results from skid steering. Detection is easier to avoid, as well, as vector steering causes less detectable disturbance to ground surfaces.

Having described certain embodiments, numerous alternative embodiments or variations can be made. Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 780 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A tracked vehicle, comprising:
   a vehicle body;
   a first set of wheels coupled to the vehicle body and including a first steerable wheel configured to turn left and right relative to the vehicle body;

a second set of wheels coupled to the vehicle body and including a second steerable wheel configured to turn left and right relative to the vehicle body;
a first deformable track that surrounds the first set of wheels and engages the first steerable wheel; and
a second deformable track that surrounds the second set of wheels and engages the second steerable wheel,
wherein the first deformable track is configured to deform into a first curved shape in response to the first steerable wheel turning left or right,
wherein the second deformable track is configured to deform into a second curved shape in response to the second steerable wheel turning left or right, the second curved shape having a different turning radius than the first curved shape, and
wherein the tracked vehicle is configured to operate in a steering mode that combines (i) vector steering based on turning the first steerable wheel and the second steerable wheel in response to steering input and (ii) skid steering based on the first deformable track and the second deformable track being advanced at different speeds in response to the steering input.

2. The tracked vehicle of claim 1, wherein the first steerable wheel is coupled to the vehicle body via a thrust actuator configured to controllably retract and extend relative to the vehicle body for respectively moving the first steerable wheel toward and away from the vehicle body.

3. The tracked vehicle of claim 2, wherein the thrust actuator is configured to retract in response to the first steerable wheel turning in one of a left or right direction and to extend in response to the first steerable wheel turning in the other of the left or right direction.

4. The tracked vehicle of claim 1, wherein the first set of wheels includes a non-steerable wheel coupled to the vehicle body via a thrust actuator configured to controllably retract the non-steerable wheel relative to the vehicle body as the first steerable wheel turns in one of a left or right direction and to extend the non-steerable wheel relative to the vehicle body as the first steerable wheel turns in the other of the left or right direction.

5. A method of steering a tracked vehicle that includes—
a vehicle body,
a first set of wheels coupled to the vehicle body and including a first steerable wheel configured to turn left and right relative to the vehicle body, and
a second set of wheels coupled to the vehicle body and including a second steerable wheel configured to turn left and right relative to the vehicle body,
the method comprising:
providing a first deformable track that surrounds the first set of wheels and engages the first steerable wheel;
providing a second deformable track that surrounds the second set of wheels and engages the second steerable wheel;
in response to turning the first steerable wheel and the second steerable wheel, the first deformable track and the second deformable track respectively deforming into first and second curved shapes that arc left or right, and
operating the tracked vehicle in a blended steering mode that combines (i) vector steering based on turning the first steerable wheel and the second steerable wheel in response to steering input and (ii) skid steering based on the first deformable track and the second deformable track being advanced at different speeds in response to the steering input.

6. The method of claim 5, wherein the steering input is received from a driver of the tracked vehicle.

7. The method of claim 6, further comprising processing the steering input to:
(i) turn the first and second steerable wheels in response to the steering input and
(ii) advance the first and second deformable tracks at respective speeds in response to the steering input.

8. The method of claim 6, further comprising:
providing a vector steering mode in which the tracked vehicle is steered by vector steering based on turning the first steerable wheel and the second steerable wheel in response to the steering input;
providing a skid steering mode in which the tracked vehicle is steered by skid steering in which the first deformable track and the second deformable track are advanced at different speeds in response to the steering input while the first steerable wheel and the second steerable wheel are pointed straight ahead; and
selecting between the vector steering mode and the skid steering mode based on the steering input.

9. The method of claim 8, further comprising:
selecting between the vector steering mode, the skid steering mode, and the blended steering mode based on the steering input.

10. The method of claim 9, further comprising receiving the steering input from a steering wheel or joystick, wherein selecting between the vector steering mode, the skid steering mode, and the blended steering mode is based on the steering input received from the steering wheel or joystick.

11. The method of claim 6, further comprising:
when turning the tracked vehicle in a first direction, extending the first steerable wheel but not the second steerable wheel away from the vehicle body; and
when turning the tracked vehicle in a second direction opposite the first direction, extending the second steerable wheel but not the first steerable wheel away from the vehicle body.

12. The method of claim 6, wherein the first set of wheels includes a first non-steerable wheel, wherein the second set of wheels includes a second non-steerable wheel, and wherein the method further comprises:
when turning the tracked vehicle in a first direction, extending the second non-steerable wheel but not the first non-steerable wheel away from the vehicle body; and
when turning the tracked vehicle in a second direction opposite the first direction, extending the first non-steerable wheel but not the second non-steerable wheel away from the vehicle body.

13. The method of claim 6, further comprising, when making a turn by the tracked vehicle, advancing the first deformable track and the second deformable track at different speeds to account for different distances traveled by the first deformable track and the second deformable track while making the turn.

14. The method of claim 6, wherein the first set of wheels includes a first additional steerable wheel, wherein the second set of wheels includes a second additional steerable wheel, and wherein the method further comprises:
when turning the first steerable wheel in one of a left or right direction, turning the first additional steerable wheel in the other of the left or right direction; and
when turning the second steerable wheel in one of a left or right direction, turning the second additional steerable wheel in the other of the left or right direction.

15. A method of steering a tracked vehicle, comprising:
providing a first deformable track on a first side of the vehicle, the first deformable track surrounding a first set of wheels and engaging a first steerable wheel of the first set of wheels;
providing a second deformable track on a second side of the vehicle, the second deformable track surrounding a second set of wheels and engaging a second steerable wheel of the second set of wheels; and
operating the tracked vehicle in a blended steering mode that combines (i) vector steering based on turning the first steerable wheel and the second steerable wheel in response to steering input and (ii) skid steering based on the first deformable track and the second deformable track being advanced at different speeds in response to the steering input.

16. The method of claim 15, further comprising receiving the steering input from a driver of the tracked vehicle.

17. The method of claim 16, further comprising processing the steering input to (i) turn the first and second steerable wheels in response to the steering input and (ii) advance the first and second deformable tracks at respective speeds in response to the steering input.

18. The method of claim 15, further comprising operating the tracked vehicle in a vector steering mode based on turning the first steerable wheel and the second steerable wheel in response to the steering input.

19. The method of claim 18, further comprising operating the tracked vehicle in a skid steering mode based on the first deformable track and the second deformable track being advanced at different speeds in response to the steering input.

20. The method of claim 19, further comprising selecting between the vector steering mode, the skid steering mode, and the blended steering mode based on the steering input.

* * * * *